US012323834B2

(12) United States Patent
Chen et al.

(10) Patent No.: US 12,323,834 B2
(45) Date of Patent: *Jun. 3, 2025

(54) MECHANISMS FOR RADIO LINK FAILURE (RLF) REPORTING TO NETWORK

(71) Applicant: Apple Inc., Cupertino, CA (US)

(72) Inventors: Yuqin Chen, Shenzhen (CN); Yushu Zhang, Beijing (CN); Fangli Xu, Beijing (CN); Qiming Li, Beijing (CN); Chunhai Yao, Beijing (CN); Gurunadha Rao Kota, Bangalore (IN); Zhibin Wu, Los Altos, CA (US); Haijing Hu, Beijing (CN); Dawei Zhang, Saratoga, CA (US); Panagiotis Botsinis, Munich (DE); Christian Hofmann, Munich (DE); Sameh M Eldessoki, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,904

(22) Filed: Apr. 11, 2023

(65) Prior Publication Data

US 2023/0247457 A1 Aug. 3, 2023

Related U.S. Application Data

(63) Continuation of application No. 17/337,321, filed on Jun. 2, 2021, now Pat. No. 11,659,422.

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0626* (2013.01); *H04L 1/1614* (2013.01); *H04W 56/001* (2013.01)

(58) Field of Classification Search
CPC ... H04W 24/08; H04W 56/001; H04W 24/02; H04W 76/19; H04W 24/10; H04W 56/00;
(Continued)

(56) References Cited

U.S. PATENT DOCUMENTS

| 2013/0028236 A1* | 1/2013 | Jung | ................ | H04W 36/0072 370/331 |
| 2019/0081691 A1 | 3/2019 | Nagaraja | | |

(Continued)

FOREIGN PATENT DOCUMENTS

| CN | 107431958 | 12/2017 |
| CN | 111345058 | 6/2020 |

(Continued)

OTHER PUBLICATIONS

Extended European Search Report for EP Patent Application No. 22176019.2; Oct. 24, 2022.
(Continued)

*Primary Examiner* — Ayanah S George
(74) *Attorney, Agent, or Firm* — Kowert, Hood, Munyon, Rankin & Goetzel, P.C.

(57) ABSTRACT

When a user equipment (UE) encounters a radio link failure condition, the UE may transmit a radio link failure report to a network. The report may include information defining the radio link monitoring (RLM) resources of a current RLM configuration. The information may take the form of a resource bitmap or a list of resource identifiers/indices. The network may use the information (and radio resource management measurements) to determine whether the radio link failure occurred due to misconfiguration of RLM resources for the UE. In cases where the network does not provide RLM configuration, the UE may omit the bitmap (or list), or populate the bitmap with all zeros, or populate the bitmap (or list) according to a currently active Transmission Con-
(Continued)

figuration Indication (TCI) state, which is indicated by downlink control information (DCI).

20 Claims, 9 Drawing Sheets

(51) Int. Cl.
*H04L 1/1607* (2023.01)
*H04W 56/00* (2009.01)

(58) Field of Classification Search
CPC .... H04W 76/18; H04B 7/0626; H04L 1/1614; H04L 5/004; H04L 5/0053; H04L 5/005
See application file for complete search history.

(56) References Cited

U.S. PATENT DOCUMENTS

| | | | |
|---|---|---|---|
| 2020/0252821 A1 | 8/2020 | Deogun | |
| 2020/0344019 A1* | 10/2020 | Da Silva | H04W 24/10 |
| 2021/0028984 A1* | 1/2021 | Da Silva | H04L 41/0813 |
| 2021/0051499 A1 | 2/2021 | Chen | |
| 2021/0337416 A1* | 10/2021 | Wu | H04L 5/0048 |

FOREIGN PATENT DOCUMENTS

| | | |
|---|---|---|
| CN | 111436054 | 7/2020 |
| CN | 111972040 | 11/2020 |
| CN | 112823539 | 5/2021 |
| WO | 2019097432 | 5/2019 |
| WO | 2020067855 | 4/2020 |

OTHER PUBLICATIONS

Office Action for Japanese Pat. Application No. 2022-090046; Jun. 12, 2023.
Apple Inc. "Discussion on RLF reporting"; 3GPP TSG-RAN WG2 Meeting #113bis-e R2-2103875; Apr. 2021.
Office Action for CN Patent Application No. 202210606344.1; Dec. 5, 2024.
Office Action for IN 202214030344; Apr. 3, 2025.

* cited by examiner

```
-- ASN1START
-- TAG-RADIOLINKMONITORINGCONFIG-START

RadioLinkMonitoringConfig ::=   SEQUENCE {
    failureDetectionResourcesToAddModList   SEQUENCE (SIZE(1..maxNrofFailureDetectionResources)) OF RadioLinkMonitoringRS
                                                                                                    OPTIONAL, -- Need N
    failureDetectionResourcesToReleaseList  SEQUENCE (SIZE(1..maxNrofFailureDetectionResources)) OF RadioLinkMonitoringRS-Id
                                                                                                    OPTIONAL, -- Need N
    beamFailureInstanceMaxCount     ENUMERATED {n1, n2, n3, n4, n5, n6, n8, n10}                    OPTIONAL, -- Need R
    beamFailureDetectionTimer       ENUMERATED {pbfd1, pbfd2, pbfd3, pbfd4, pbfd5, pbfd6, pbfd8, pbfd10}  OPTIONAL, -- Need R
    ...
}

RadioLinkMonitoringRS ::=   SEQUENCE {
    radioLinkMonitoringRS-Id    RadioLinkMonitoringRS-Id,
    purpose                     ENUMERATED {beamFailure, rlf, both},
    detectionResource           CHOICE {
        ssb-Index                   SSB-Index,
        csi-RS-Index                NZP-CSI-RS-ResourceId
    },
    ...
}

-- TAG-RADIOLINKMONITORINGCONFIG-STOP
-- ASN1STOP
```

FIG. 9

```
MeasResultRLFNR-r16 ::=        SEQUENCE {
    measResult-r16             SEQUENCE {
        cellResults-r16        SEQUENCE{
            resultsSSB-Cell-r16       MeasQuantityResults    OPTIONAL,
            resultsCSI-RS-Cell-r16    MeasQuantityResults    OPTIONAL
        },
        rsIndexResults-r16     SEQUENCE{
            resultsSSB-Indexes-r16        ResultsPerSSB-IndexList      OPTIONAL,
            ssbRLMConfigBitmap-r16        BIT STRING (SIZE (64))       OPTIONAL,
            resultsCSI-RS-Indexes-r16     ResultsPerCSI-RS-IndexList   OPTIONAL,
            csi-rsRLMConfigBitmap-r16     BIT STRING (SIZE (96))       OPTIONAL,
            csi-rsRLMConfigBitmapExt-r16  BIT STRING (SIZE (96))       OPTIONAL
        }
    }
}
```

> transmit a report to a network, the report indicating a radio link failure, wherein the report includes information specifying a set of reference signal resources associated with a radio link monitoring (RLM) configuration of the UE device 1110

> receive a report from a user equipment (UE) device, the report indicating a radio link failure, wherein the report includes information specifying a set of reference signal resources associated with a radio link monitoring (RLM) configuration of the UE device 1210

> in a context where a network of the UE device does not provide (or has not provided) radio link monitoring configuration to the UE device, transmit a report to a network, the report indicating a radio link failure 1310

> in a context where a network of a user equipment (UE) device does not provide radio link monitoring configuration to the UE device, receive a report from a user equipment (UE) device, wherein the report indicates a radio link failure 1410

*FIG. 14*

MECHANISMS FOR RADIO LINK FAILURE (RLF) REPORTING TO NETWORK

PRIORITY CLAIM

This application is a continuation of U.S. patent application Ser. No. 17/337,321, entitled "Mechanisms for Radio Link Failure (RLF) Reporting to Network," filed Jun. 2, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to the field of wireless communication, and more particularly, to mechanisms for reporting radio link failure from a user equipment (UE) device to a wireless communication network.

DESCRIPTION OF THE RELATED ART

A network (e.g., a base station of the network) may transmit signals to and/or receive signals from user equipment (UE) devices using spatially concentrated beams, especially when operating at high frequencies. Different beams may be used for communication with different UE devices (or different groups of UE devices); and different beams may be used for communication with a UE device at different times. A base station of the network may be equipped with one or more antenna arrays (e.g., at one or more transmission-reception points) to facilitate the generation of beams. Similarly, a UE device may be equipped with one or more antennas arrays, to enable the UE device to generate transmit and/or receive beams.

A network may configure a UE device to independently perform a radio resource management (RRM) process and a radio link monitoring (RLM) process. While in a connected state, the UE device may perform the RRM process according to an RRM configuration, and independently perform the RLM process according to an RLM configuration. Each configuration (RRM and RLM) has an associated set of reference signal resources. However, the resources of RRM configuration and the resources of the RLM configuration may be indicated to the UE device in terms of independent sets of resource indices (or identifiers). Thus, it may be difficult for the UE device to determine whether a resource (or physical resource element) of the RRM configuration belongs to the RLM configuration.

A base station of a wireless network may include reference signals (such as SSB or CSI-RS) in its downlink transmissions, enabling a UE device to measure the quality of the radio link between the base station and the UE device. (SSB is an acronym for Synchronization Signal/PBCH Block. PBCH is an acronym for Physical Broadcast Channel. CSI-RS stands for Channel State Information—Reference Signal.) The base station may (or may not) configure the UE device with a radio link monitoring (RLM) configuration. Different UE devices may be configured with different RLM configurations. (Each RLM configuration may be associated with a corresponding set of one or more beams.) An RLM configuration may include (or specify) a corresponding set of resources that the UE device is to use for monitoring the radio link.

When the UE device encounters a radio link failure on a first cell, it may connect to a second cell, and report the failure to the network via the second cell. The radio link failure report may include measurements from the RRM process. Furthermore, it may be desirable for the report to indicate which resources of the RRM configuration belong to the RLM configuration. However, the UE device may find it difficult to determine which resources of the RRM configuration belong to the RLM configuration. The translation process is complicated.

In current RLF reporting, the UE may need to compare if the physical resource elements associated with each resource ID in the RRM configuration are also included in the configuration of RLM resources.

SUMMARY

From a configuration point of view, it may be very convenient to specify the RRM configuration in terms of a set of resource IDs, and specify the RLM configuration in terms of an independent set of resource IDs. For example, resource ID=1 in the RRM configuration may refer to a group of physical resource elements with a period of 10 milliseconds. (This numeric example is given for illustrative purposes, and the specific values mentioned are not meant to be limiting to the scope of the invention.) However, some of the physical resource elements of the group may belong to the RLM configuration while other physical resource elements of the group do not. More generally, it can be difficult for the UE to determine which physical resource elements of an RRM configuration belong to the RLM configuration.

Furthermore, the gNB may use the same physical resource element for two purposes. For example, one transmission-reception point (TRP) of the gNB may use the physical resource element for RRM, with a first transmit power value, while another TRP of the gNB uses the physical resource element for RLM, with a different transmit power value. Thus, it may be advantageous to avoid the above mentioned comparison at the UE device.

In some embodiments, the UE device may transmit a radio link failure report to the network (e.g., to a base station of the network), indicating a radio link failure between the base station and the UE device. (The network may use the radio link failure report to improve or optimize the network deployment.) The report may include a bitmap indicating the resources of an RLM configuration, e.g., an RLM configuration that is currently active in the UE device. (The network may have previously configured the UE device with the RLM configuration.) The length of the bitmap may be equal to the number of possible radio link monitoring resources (which is larger than the number of RRM resources assigned to the UE). The bitmap enables the network to identify the UE's RLM configuration, e.g., in case it has discarded the UE's context.

In alternative embodiments, the report may include a list of identifiers or indices of RLM resources that specify the RLM configuration of the UE device, e.g., a list of CSI-RS IDs, or a list of SSB indices.

In some embodiments, the UE device may operate in a context where the network has not (or does not) provide RLM configuration to the UE device. In this context, the UE device may transmit a radio link failure report that includes a bitmap whose elements correspond to possible RLM resources. The bitmap may be populated with zeros, e.g., to indicate that the UE has no RLM configuration. Alternatively, the bitmap may be populated according to an active TCI state. (TCI is an acronym for Transmission Configuration Indication.) The active TCI state is determined by downlink control information (DCI) transmitted to the UE device in a Physical Downlink Control Channel (PDCCH). In other embodiments within the above mentioned context, the UE device may transmit a radio link failure report that does not include any RLM-related bitmap. In yet other embodiments within the above mentioned context, the UE device may transmit a list of identifiers or indices, where the list specifies RLM resources associated with the active TCI state, which is signaled to the UE device via downlink control information. In yet further embodiments within to the above mentioned context, the UE device may transmit a radio link failure report that does not include any RLM-related resource list or data structure.

In some embodiments, a Transmission Configuration Indicator (TCI) state may be dynamically signaled to the UE device via downlink control information (DCI) in the Physical Downlink Control Channel (PDCCH). The TCI state may include configuration of QCL-relationships between one or more downlink reference signals and one or more DMRS ports of the PDSCH. (QCL is an acronym for Quasi Co-Location. PDSCH is an acronym for Physical Downlink Shared Channel. DMRS is an acronym for Demodulation Reference Signal.) Thus, channel properties inferred from the reference signal(s) may be used to decode data, e.g., data from the Physical Downlink Shared Channel (PDSCH). The UE may be configured with a number of TCI State configurations, e.g., using RRC signaling. One of the TCI State configurations may be designated as an active configuration, e.g., via DCI signaling.

A radio link failure report may include information indicating RRM resources according to an active TCI state of the UE device (e.g., an active TCI state of the UE device) at the time the radio link failure occurred in a last serving cell.

In some embodiments, a non-transitory memory medium may store program instructions. The program instructions, when executed by processing circuitry, may cause the processing circuitry to perform any of the method embodiments described above.

In some embodiments, a user equipment (UE) device may include a radio subsystem; processing circuitry coupled to the radio subsystem; and memory storing program instructions. The program instructions, when executed by the processing circuitry, may cause the UE device to perform any of the method embodiments described above.

In some embodiments, a non-transitory memory medium may store program instructions. The program instructions, when executed by processing circuitry, may cause the processing circuitry to perform any of the method embodiments described above.

In some embodiments, a base station may include a radio subsystem; processing circuitry coupled to the radio subsystem; and memory storing program instructions. The program instructions, when executed by the processing circuitry, may cause the base station to perform any of the method embodiments described above.

BRIEF DESCRIPTION OF THE DRAWINGS

A better understanding of the present subject matter can be obtained when the following detailed description of the preferred embodiment is considered in conjunction with the following drawings.

FIG. 9 illustrates an example of a radio link monitoring (RLM) configuration that may be used by a user equipment device, according to some embodiments.

FIG. 10 illustrates an example of a radio link failure report, according to some embodiments.

FIG. 11 illustrates a method according to some embodiments, i.e., a method for operating a user equipment (UE) device, including the action of transmitting a report to a network, the report indicating a radio link failure.

FIG. 12 illustrates a method according to some embodiments, i.e., a method for operating a network node, including the action of receiving a report from a user equipment (UE) device, where the report indicates a radio link failure and includes information specifying a set of reference signal resources associated with a radio link monitoring configuration of the UE device.

FIG. 13 illustrates a method according to some embodiments, i.e., a method for operating a user equipment (UE) device in a context where a network of the UE device does not provide (or has not provided) radio link monitoring configuration to the UE device. In this context, the UE device may transmit a report to a network, to indicate a radio link failure.

FIG. 14 illustrates a method according to some embodiments, i.e., a method for operating a network node in a context where a network of a user equipment (UE) device does not provide radio link monitoring configuration to the UE device. In this context, the UE device may receive a report from the UE device, where the report indicates a radio link failure.

Figure 1:
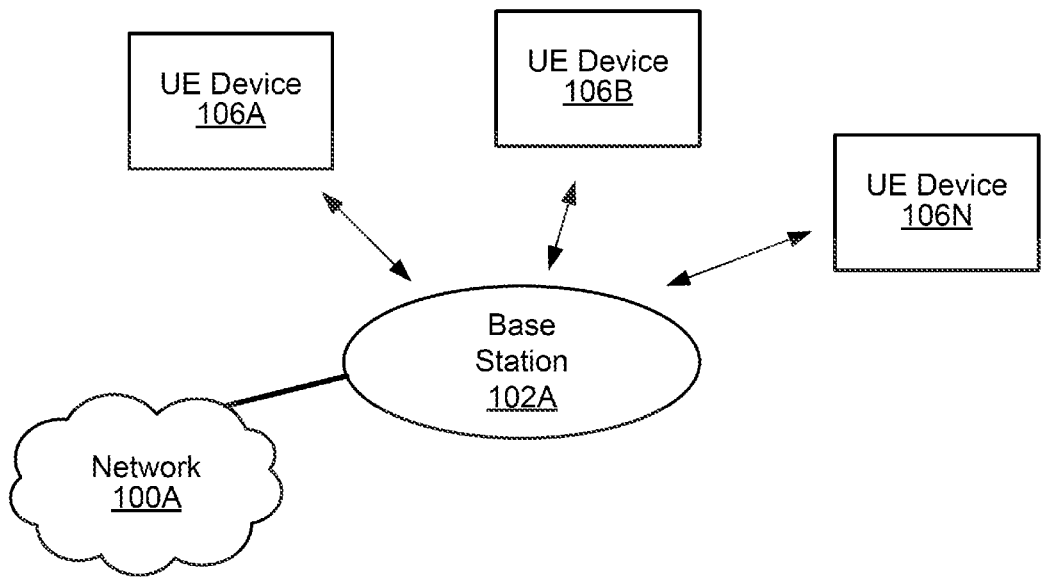
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BW: Bandwidth BWP: Bandwidth Part
CSI: Channel State Information
CSI-RS: CSI Reference Signal
DCI: Downlink Control Information
DL: Downlink
eNB (or eNodeB): Evolved Node B, i.e., the base station of 3GPP LTE
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Medium Access Control
MAC-CE: MAC Control Element
NR: New Radio
NR-DC: NR Dual Connectivity
NW: Network
PBCH: Physical Broadcast Channel
PDCCH: Physical Downlink Control Channel
PDSCH: Physical Downlink Shared Channel
RAT: Radio Access Technology
RLM: Radio Link Monitoring
RNTI: Radio Network Temporary Identifier
RRC: Radio Resource Control
RRM: Radio Resource Management
RS: Reference Signal
SR: Scheduling Request
SSB: Synchronization Signal/PBCH Block
TCI: Transmission Configuration Indication
UE: User Equipment
UL: Uplink
UMTS: Universal Mobile Telecommunications System Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
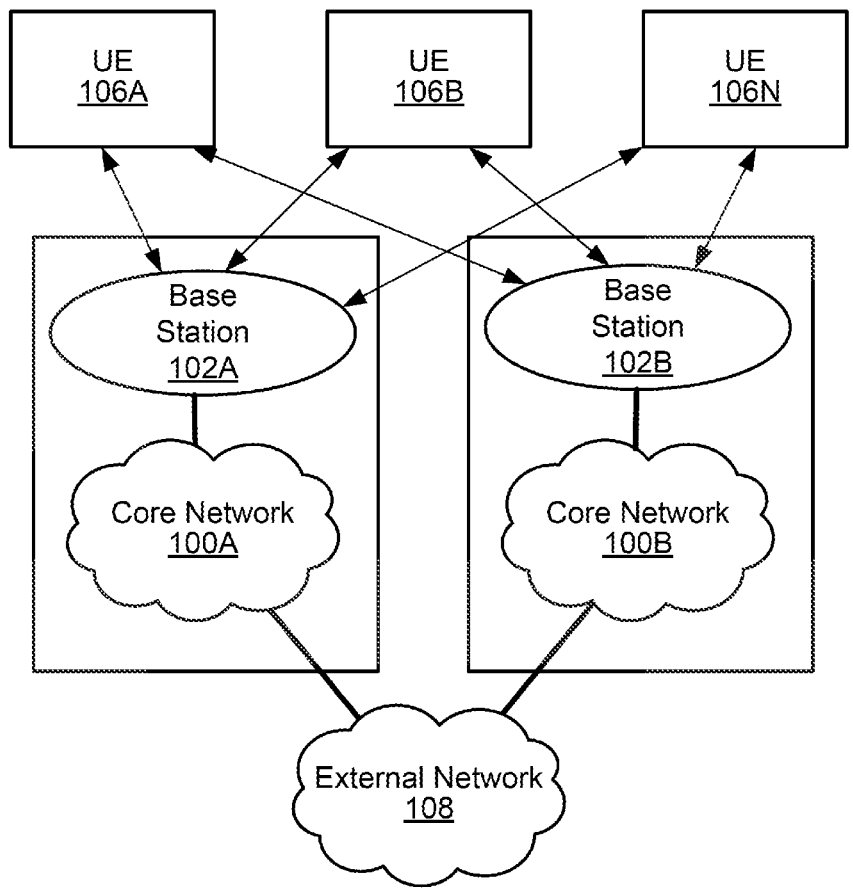
Figure 3:
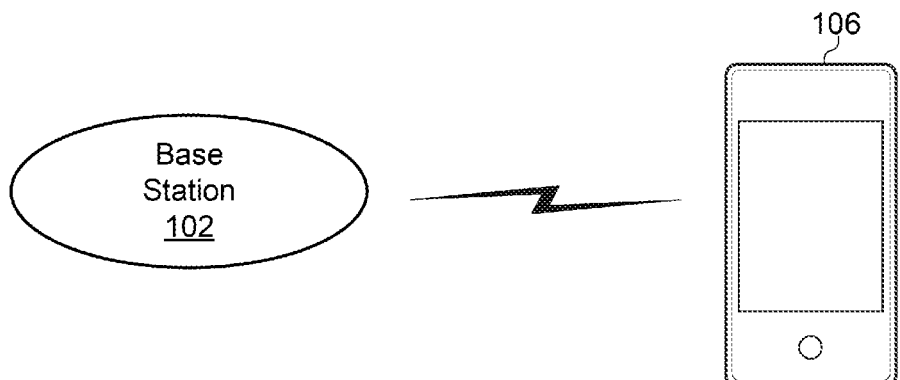
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1xRTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
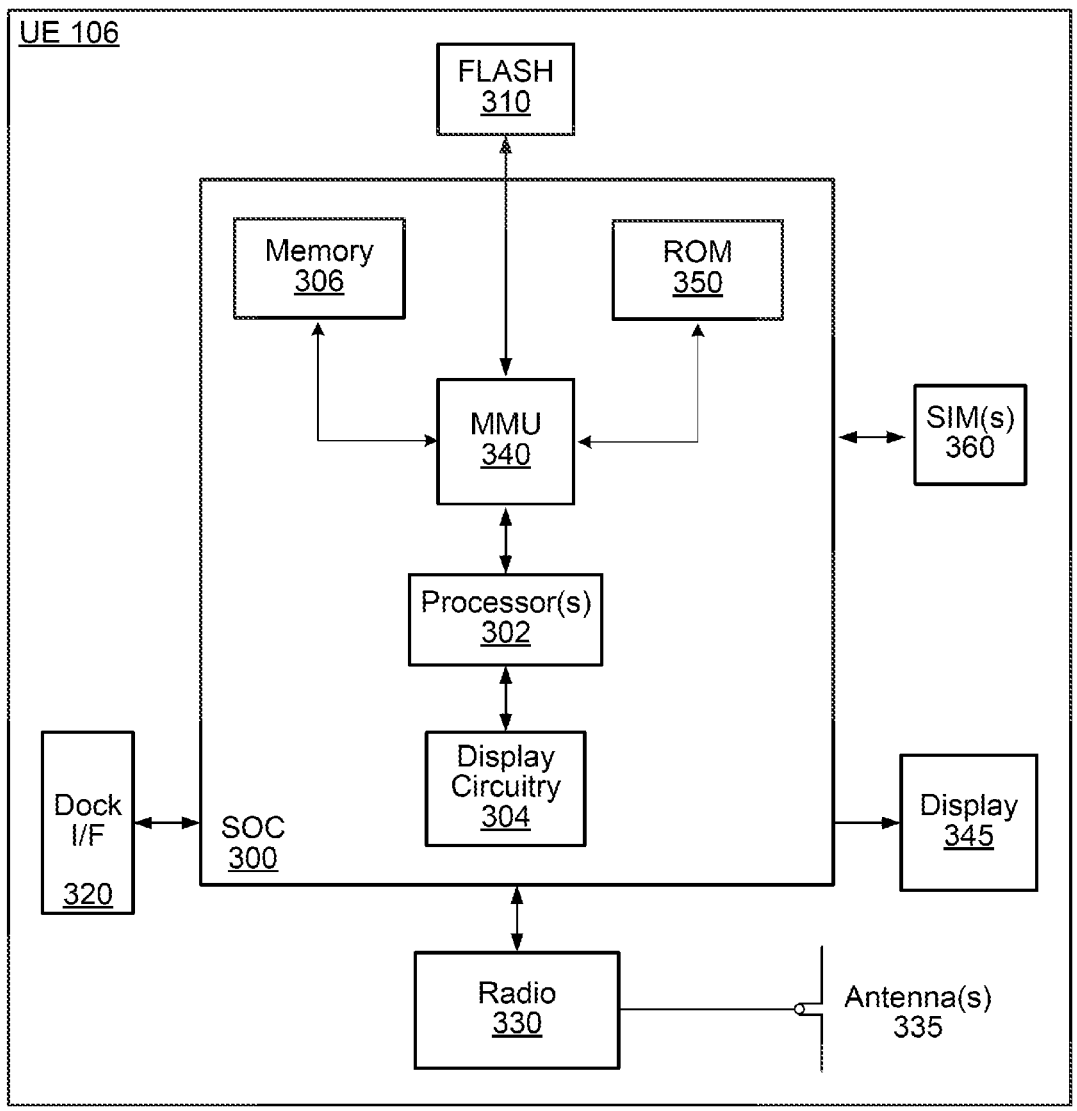
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Hash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Hash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
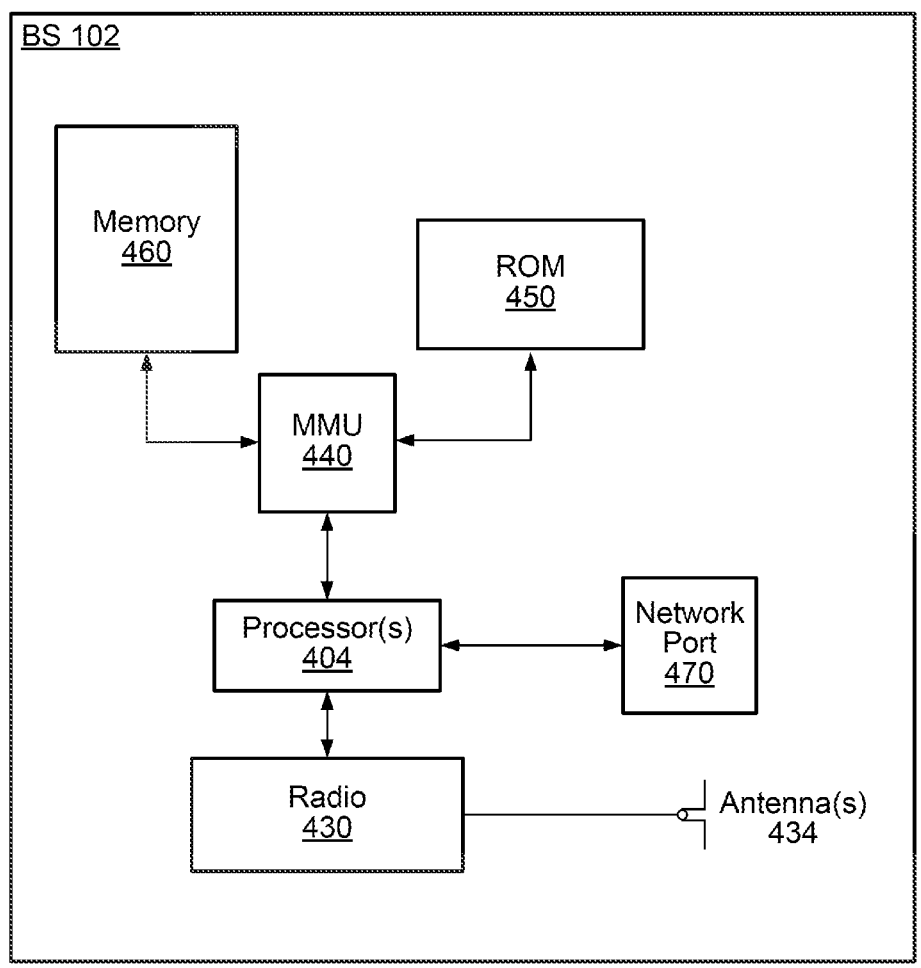
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, 5G New Radio, WCDMA, CDMA2000, etc.

The processor(s) 404 of the base station 102 may be configured to implement any of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
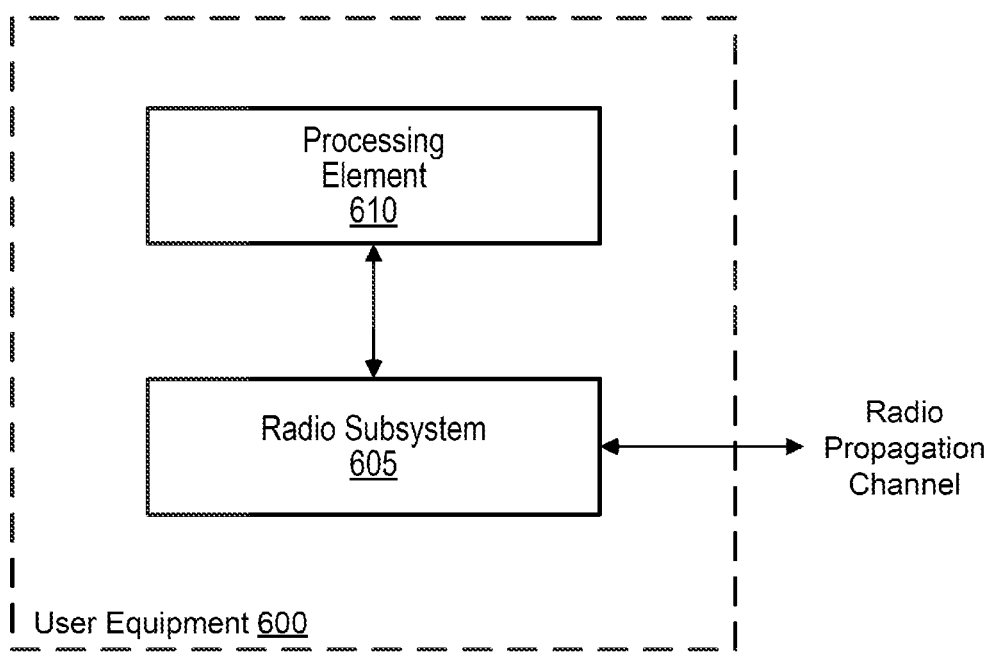
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem. The processing element may be configured to perform any of the UE-based method embodiments described herein.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
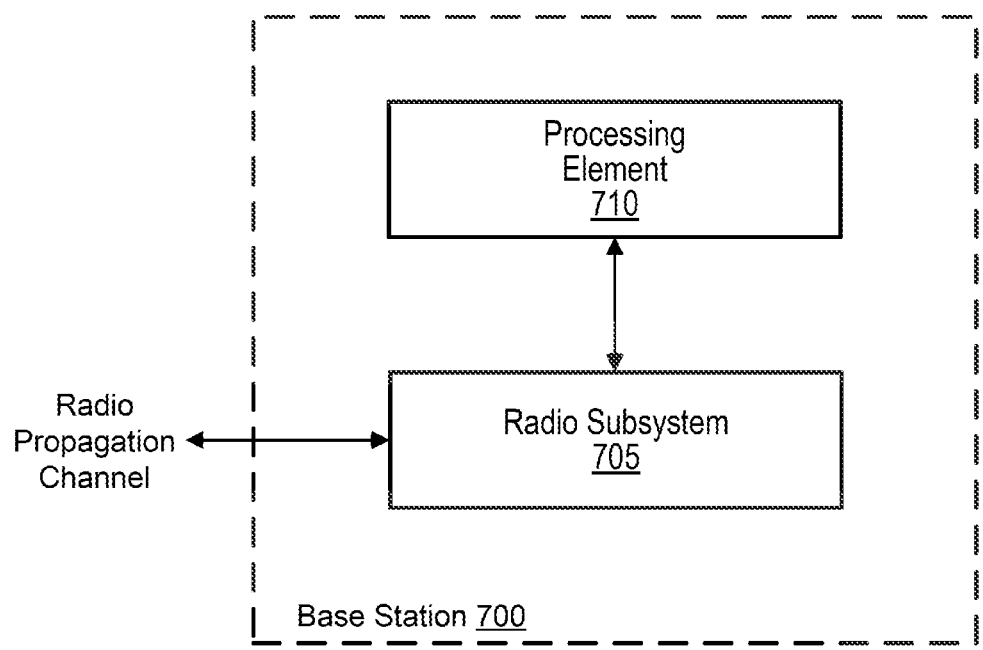
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 710 may include one or more RF chains. Each RF chain may be tunable to a desired frequency, thus allowing the RF chain to receive or transmit at different frequencies at different times. The radio subsystem 710 may be coupled to an antenna subsystem, including one or more antennas, e.g., an array of antennas, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to:

(a) generate baseband signals to be transmitted by the radio subsystem, and/or, (b) process baseband signals provided by the radio subsystem.

The processing element 710 may be configured to perform any of the base station method embodiments described herein.

Enhancement of Radio Link Failure (RLF) Reporting

A user equipment (UE) may perform radio link failure (RLF) reporting to assist the network (NW) to improve (or optimize) its network deployment. An RLF report may include information such as: the cell ID of the cell in which the UE encountered the radio link failure; results of RRM-related measurements on that cell; a cause indication for the radio link failure; etc. For example, a UE operating according 3GPP 5G New Radio may report radio link failure to the network using an RLF-Report message, e.g., as defined in 3GGP TS 38.331 Release 16. The RLF-Report message includes a measResultLastServCell message, which provides measurement result information for the last serving cell of the UE. The measResultLastServCell message may be structured, e.g., according to the MeasResultRLFNR-r16 structure as follows:

```
MeasResultRLFNR-r16 ::=        SEQUENCE {
  measResult-r16                 SEQUENCE {
    cellResults-r16                SEQUENCE{
      resultsSSB-Cell-r16            MeasQuantityResults       OPTIONAL,
      resultsCSI-RS-Cell-r16         MeasQuantityResults       OPTIONAL
    },
    rsIndexResults-r16             SEQUENCE{
      resultsSSB-Indexes-r16         ResultsPerSSB-IndexList   OPTIONAL,
      ssbRLMConfigBitmap-r16         BIT STRING (SIZE (64))    OPTIONAL,
      resultsCSI-RS-Indexes-r16      ResultsPerCSI-RS-IndexList OPTIONAL,
      csi-rsRLMConfigBitmap-r16      BIT STRING (SIZE (96))    OPTIONAL
    }                                                          OPTIONAL
  }
}
```

While the above structure involves a specific set of fields, with specific sizes and specific ordering, it should be understood that the principles are of present invention(s) are not so limited. Indeed, the present disclosure contemplates are wide variety of possible combinations of fields, ordering of fields, and sizes of fields.

Figure 8:
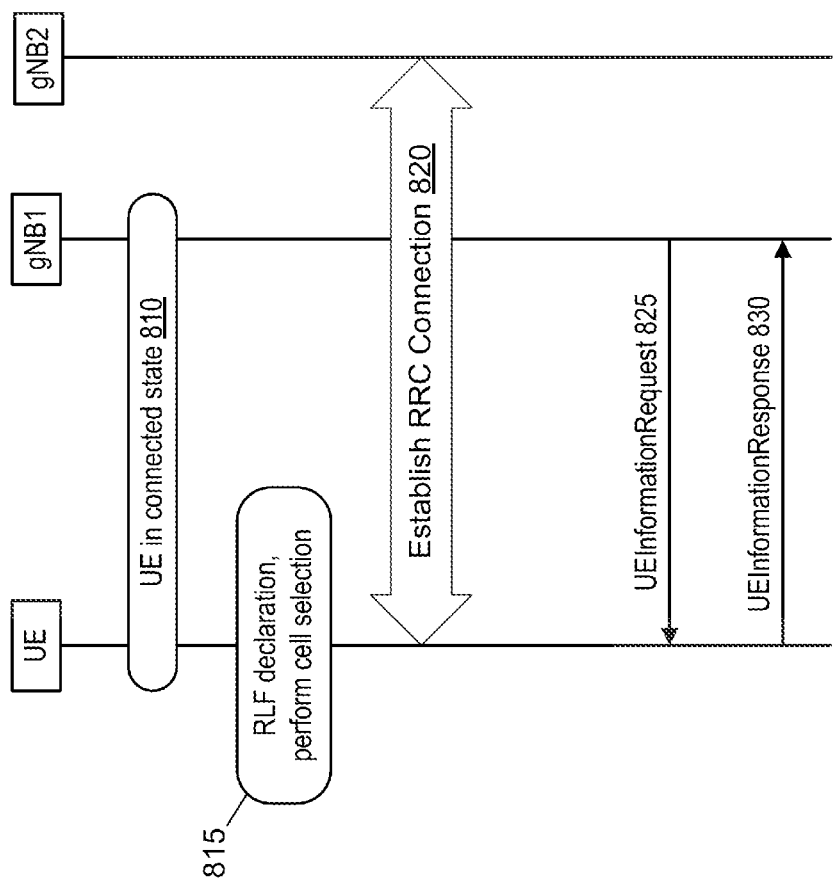
FIG. 8 illustrates an example of a procedure for reporting radio link failure (RLF) to a network of the UE device, according to some embodiments.

A procedure for reporting radio link failure to the network is illustrated in FIG. 8, according to some embodiments.

At 810, the UE is in a connected state with respect a first gNB (referred to as gNB1).

At 815, the UE encounters a radio link failure (RLF) with gNB1; makes a radio link failure (RLF) declaration; and performs a cell selection procedure to select another cell. (It is possible that the cell selection procedure selects the same cell as before the radio link failure, e.g., as when a UE passes through and emerges from a coverage hole in a cell. Thus, in some situations, the last serving cell and the current cell of the UE may be the same.)

At 820, the UE establishes an RRC connection with a second gNB (referred to as gNB2), e.g., with a gNB determined in the cell selection procedure. For example, the UE may perform an RRC connection setup procedure or an RRC reestablishment procedure. As part of the process of establishing an RRC connection, the UE may send a completion message to gNB2, including an indication of "RLF availability", i.e., the availability of information relating to radio link failure.

In response to the RLF availability indication, gNB2 may send an information request (UEInformation Request 825) to the UE, requesting the RLF-related information.

In response to the information request 825, the UE may send an information response message (UEInformationResponse 830) to gNB2. This information response message may be structured according to the MeasResultRLFNR-r16 structure, as described above.

In current RLF reporting, the UE reports the RRM measurement result for each reference resource (e.g., each SSB resource, or each CSI-RS resource) in the RRM configuration. For each reference resource, the UE may also indicate if the reference resource is configured for the purpose of radio link monitoring (RLM). The RLF reporting may allow the network (NW) to determine if the radio link failure is due to actual channel quality degradation or due to misconfiguration of RLM resources. For example, if the UE may have sufficiently high channel quality on beams 1 and 2, but declare radio link failure because the network has configured inappropriate RLM resources (e.g., resources associated with beams 3 and 4) for the UE.

There are a number of issues with current RLF reporting. As one issue, it is difficult for the UE to determine if a resource (especially a CSI-RS resource) from an RRM configuration and a resource from an RLM configuration are actually the same resource. Note that in typical multi-TRP deployment, a base station (e.g., a gNB) may use different transmission power for different beams on the same physical resource element. In addition, the current RLF reporting is not able to provide the complete RLM resource configuration to the network. Furthermore, in situations where the network does not provide an RLM resource configuration to the UE, current RLF reporting does not specify whether and how the UE should handle the RLM configuration.

UE Echoing of RLM Configuration

In some embodiments, a user equipment (UE) may transmit a radio link failure report (to the network) that includes an indication of the currently active RLM configuration. In other words, the UE may "echo back" the currently active RLM configuration to the network, as part of the radio link failure report. (The term "echo back" implies that the network has previously configured the UE to use the RLM configuration.) The indication of the currently active RLM configuration may take the form of a bitmap. The bitmap may indicate the resources of the RLM configuration.

In some embodiments, the UE may report the currently active RLM configuration only for the active bandwidth part (BWP).

In some embodiments, the elements of the bitmap may correspond to respective RLM resources in a space of RLM resources (e.g., a space of CSI-RS resource, or a space of SSB resources). Each element indicates whether the corresponding RLM resource is included in the currently active RLM configuration. The length of the bitmap may equal the number of RLM resources (e.g., CSI-RS resources, or SSB resources) in the space of RLM resources, which is larger than the number of RRM resources assigned to the UE.

In some embodiments, a radio link monitoring (RLM) configuration may have the structure shown in FIG. 9. However, it should be understood that a wide variety of other structures are possible for the RLM configuration.

In some cases, the RLM configuration may be a configuration of CSI-RS resources. In other cases, the RLM configuration may be a configuration of SSB resources.

In some embodiments, the radio link failure report may be realized by a MeasResultRLFNR structure, e.g., as shown in FIG. 10. In the case where the RLM configuration is a configuration of CSI-RS resources, the MeasResultRLFNR structure may include the field csi-rsRLMConfigBitmap, as a realization of the above described bitmap. The field csi-rsRLMConfigBitmap may have a length equal to the number of CSI-RS resources for RLM, which is greater than the number of CSI-RS resources for RRM. (For example, the field csi-rsRLMConfigBitmap may have a length of 192 bits. However, it should be noted that a wide variety of sizes are contemplated for csi-rsRLMConfigBitmap.) Alternatively, the MeasResultRLFNR structure may include a field csi-rsRLMConfigBitmap and a field csi-rsRLMConfigBitmapExt that together realize the above described bitmap, as shown in FIG. 10. Thus, the sum of the lengths of csi-rsRLMConfigBitmap and csi-rsRLMConfigBitmapExt may be equal to the number of CSI-RS resources for RLM.

Note that the ASN.1 grammar was not considered here, in order to provide a visual impression on the change to ASN.1. (ASN.1 is an acronym for Abstract Syntax Notation One.)

In some embodiments, the field csi-rsRLMConfigBitmap may be used to indicate the CSI-RS indexes configured in the RLM configuration for the active bandwidth part (BWP).

In the case where the RLM configuration is a configuration of SSB resources, the MeasResultRLFNR structure may include the field ssbRLMConfigBitmap, as a realization of the bitmap of the radio link failure report. The bitmap may have a length equal to the number of SSB resources for RLM.

In some embodiments, the field ssbRLMConfigBitmap may be used to indicate the SS/PBCH block indexes configured in RLM configurations for the active bandwidth part (BWP).

In one set of embodiments, a method 1100 for operating a user equipment (UE) device may include the operations shown in FIG. 11. (The method 1100 may also include any subset of the features, elements or operations described above in connection with FIGS. 1-10 and described below in connection with FIGS. 12-14.) The method 1100 may be performed by processing circuitry of the UE device, e.g., by the processing element 610 of user equipment 600.

As shown at 1110, the processing element may transmit a report to a network, the report indicating a radio link failure, e.g., a radio link failure between the UE and a last serving cell. (The report may be transmitted to a current cell of the network after having experienced a radio link failure on the last serving cell and established a connection the current cell, e.g., as described above in connection with FIG. 8.) The report may include information specifying a set of reference signal resources associated with a radio link monitoring (RLM) configuration of the UE device. The network may previously have established the RLM configuration as the active RLM configuration for the UE device, e.g., by transmission of downlink signaling (such as an RRC Reconfiguration message) to the UE device. (RRC is an acronym for Radio Resource Control.) However, at the time of the report transmission, the network may have discarded the UE's context, e.g., because the UE has had no interaction with the network for a long while, due to the radio link failure. (The network may utilize a timer to determine when a time since last interaction with the UE device has exceeded a threshold.)

By including the information specifying the set of reference signal resources associated with the RLM configuration in the report, the UE device is relieved of the burden of determining whether each resource of the RRM configuration belongs to the RLM configuration.

In some embodiments, the action of transmitting the report to the network may include transmitting the report to a base station of the network, e.g., to a gNB of a 3GPP 5G network, or an eNB of a 3GPP Long Term Evolution (LTE) network. The base station may be the final destination of the report. Alternatively, the base station may forward the report to another network node, e.g., a previous base station that hosted the last serving cell, or a node of the network core.

In some embodiments, the above described information is a list of identifiers or indices of the reference signal resources in the set of reference signal resources associated with the RLM configuration, e.g., as variously described in the present disclosure.

In some embodiments, the information defining an RLM configuration includes a bitmap, wherein elements of the bitmap correspond respectively to RLM resources in a space of RLM resources. Each element of the bitmap may indicate whether or not a corresponding RLM resource of the space is included in the set of reference signal resources of the RLM configuration. The bitmap may be configured, e.g., as variously described above.

In some cases, the set of reference signal resources associated with the RLM configuration are channel state information reference signal (CSI-RS) resources. In other cases, the set of reference signal resources associated with the RLM configuration are Synchronization Signal and Physical Broadcast Channel Block (SSB) resources.

In some embodiments, the report may be transmitted for an active bandwidth part (BWP) of the UE device, or only for the active BWP. (The UE device may have a set of configured BWPs, but only one of configured BWPs is active at any given time, at least in some embodiments.) The active BWP may be indicated to the UE, e.g., by RRC signaling, MAC CE, or DCI from the network. (RRC is an acronym for Radio Resource Control. MAC CE stands for Medium Access Control—Control Element.) The switching of BWPs could also be controlled by timer.

In some embodiments, the report is usable by the network to determine whether the radio link failure occurred due to misconfiguration of RLM resources for the UE device.

In some embodiments, the report may be usable by the network to determine whether radio link failure occurred due to degradation of the quality of the channel between the UE device and a last serving base station (or cell or TRP) of the network, or due to inappropriate selection of RLM configuration for the UE device.

In some embodiments, the network may use RRM measurement results (e.g., channel quality information, as variously described above) of the report to determine if one or more of the beams from an available set of beams are of sufficient quality for use by the UE device. The network may select one or more beams of sufficient quality for use by the UE device, and send a configuration message directing the UE device to use the one or more selected beams, e.g., as part of a new RLM configuration for the UE device.

In some embodiments, the network may determine if the one or more beams associated with the RLM configuration indicated by the report are appropriate for the UE device. If not, the network may select a new set of one or more beams for the RLM configuration, and send a message directing the UE device to use the new set of one or more beams, e.g., as part of a new RLM configuration for the UE device.

In one set of embodiments, a method 1200 for operating a network node may include the operations shown in FIG. 12. (The method 1200 may also include any subset of the features, elements or operations described above in connection with FIGS. 1-11 and described below in connection with FIGS. 13-14.) The method 1200 may be performed by a processor of the network node, e.g., by executing program instructions stored in a memory medium of the network node.

As shown at 1210, the processor may receive a report from a user equipment (UE) device, where the report indicates a radio link failure. The report may include information specifying a set of reference signal resources associated with a radio link monitoring configuration of the UE device.

The RLM configuration may be a currently active RLM configuration of the UE device.

In some embodiments, the network node may be a base station of a network, e.g., a gNB of a 3GPP 5G network, or an eNB of a 3GPP Long Term Evolution (LTE) network.

In some embodiments, the above described information is a list of identifiers or indices of the reference signal resources in the set of reference signal resources associated with the RLM configuration, e.g., as variously described in the present disclosure.

In some embodiments, the above described information may include a bitmap, where elements of the bitmap correspond respectively to RLM resources in a space of RLM resources. Each element of the bitmap may indicates whether or not a corresponding RLM resource of the space is included in the set of reference signal resources of the RLM configuration. The bitmap may be configured, e.g., as variously described above.

In some cases, the set of reference signal resources associated with the RLM configuration are channel state information reference signal (CSI-RS) resources. In other cases, the set of reference signal resources associated with the RLM configuration are Synchronization Signal and Physical Broadcast Channel Block (SSB) resources.

In some embodiments, the report may be for an active bandwidth part (BWP) of the UE device.

In some embodiments, the processor of the network node may determine, based on the above described information (of action 1110) and the RRM measurement results, whether the RLF has occurred due to misconfiguration of RLM resource configuration.

Solutions when No RLM Configuration is Provided by the Network

In this section, mechanisms are disclosed for reporting of radio link monitoring (RLM) configuration when the network does not provide (or has not provided) RLM configuration to the UE device. In this situation, when the UE generates a radio link failure report, the UE may follow the active TCI state, which is indicated to the UE device in DCI. (DCI is an acronym for downlink control information. TCI is an acronym for Transmission Configuration Indication.) The active TCI state is associated with a network-configured set of reference signal resources, e.g., CSI-RS resources or SSB resources. (The active TCI state may indicate an active beam for data transmission and/or reception by the UE.) If the network does not configure a set of RLM resources for the UE, the UE may perform radio link monitoring using the network-configured set of reference signal resources of the active TCI-state, and/or, report radio link failure according to the active TCI state.

The radio link failure report may include a bitmap whose elements correspond to respective reference signal resources in a space of RLM resources. However, the UE may fill the bitmap so as to specify the network-configured set of reference signal resources of the active TCI state. The base station transmits DCI targeted for the UE in the Physical Downlink Control Channel (PDCCH) of a downlink signal.

In alternative embodiments, the radio link failure report UE may not include any bitmap associated with RLM resources. For example, the UE may not include any of the following bitmaps in the radio link failure report: ssbRLMConfigBitmap, csi-rsRLMConfigBitmap and csi-rsRLMConfigBitmapExt.

In other alternative embodiments, the radio link failure report may include a bitmap whose elements correspond to respective reference signal resources in the space of RLM resources, but the UE may populate the bitmap with all zeros.

In some embodiments, a radio link failure report may include the field ssbRLMConfigBitmap. When RadioLinkMonitoringConfig is present in the UE, the field ssbRLMConfigBitmap may be used to indicate the SS/PBCH block indexes configured in the RLM configuration(s) for the active BWP. (SS is an acronym for Synchronization Signal. PBCH is an acronym for Physical Broadcast Channel. BWP is an acronym for Bandwidth Part.) However, when the RadioLinkMonitoringConfig is absent in the UE, the UE may: omit the field ssbRLMConfigBitmap; or fill the field ssbRLMConfigBitmap with zeros; or fill the field ssbRLMConfigBitmap according to the active TCI-State, as indicated in DCI.

In some embodiments, a radio link failure report may include the field csi-rsRLMConfigBitmap. When RadioLinkMonitoringConfig is present in the UE, the field csi-rsRLMConfigBitmap may be used to indicate the CSI-RS indexes configured in the RLM configuration(s) for the active BWP. (CSI is an acronym for Channel State Information. RS is an acronym for Reference Signal.) However, when the RadioLinkMonitoringConfig is absent in the UE, the UE may: omit the field csi-rsRLMConfigBitmap; fill the field csi-rsRLMConfigBitmap with zeros; or fill the field csi-rsRLMConfigBitmap according to the active TCI-State, as indicated in the DCI.

FIG. 13—Operating UE Device when No RLM Configuration is Provided

In one set of embodiments, a method 1300 for operating a UE device in such a context may include the operations shown in FIG. 13. (The method 1300 may also include any subset of the features, elements or operations described above in connection with FIGS. 1-12 and described below in connection with FIG. 14.) The method 1300 may be performed by processing circuitry of the UE device, e.g., by the processing element 610 of user equipment 600.

As shown at 1310, in a context where a network of the UE device does not provide (or has not provided) radio link monitoring configuration to the UE device, the processing circuitry may transmit a report to a network (e.g., a base station of the network), where the report indicates a radio link failure.

In some embodiments, the report may include a bitmap, where elements of the bitmap correspond to respective RLM resources, e.g., to reference signal resources in a space of RLM resources (e.g., a space of CSI-RS resources, or a space of SSB resources).

In some embodiments, the bitmap may be populated entirely with zeros, to indicate that the UE device has no network-configured (e.g., RRC-configured) radio link monitoring resources.

In some embodiments, the bitmap may be populated according to an active Transmission Configuration Indication (TCI) state indicated by downlink control information (DCI). Each element of the bitmap may indicate whether the corresponding RLM resource in the space of RLM resources is included in the network-configured set of reference signal resources (e.g., CSI-RS resources, or SSB resources) associated with the active TCI state. An active TCI state may indicate the active beam for data transmission and/or reception. If the network does not configure explicit resources for radio link monitoring, the UE device may perform radio link failure reporting according the active beam.

In some embodiments, the report does not include any resource bitmap associated with radio link monitoring, e.g., as described above.

In some embodiments, the report may include a list of identifiers or indices specifying reference signal resources associated with an active TCI state of the UE device.

In one set of embodiments, a method for operating a UE device may be performed as follows. The method may be performed by processing circuitry of the UE device, e.g., by the processing element 610 of user equipment 600. In a context where the UE device does not have a radio link monitoring configuration, the processing circuitry may transmit a report to a network, where the report indicates a radio link failure. (The method may also include any subset of the features, elements or operations described above.)

In one set of embodiments, a method 1400 for operating a network node may include the operations shown in FIG. 14. (The method 1400 may also include any subset of the features, elements or operations described above in connection with FIGS. 1-13.) The method 1400 may be performed by a processor of the network node, e.g., by executing program instructions stored in a memory medium of the network node.

As shown at 1410, in a context where a network of a user equipment (UE) device does not provide radio link monitoring configuration to the UE device, the processor may receive a report from the UE device. The report may indicate a radio link failure.

In some embodiments, the report may include a bitmap, where elements of the bitmap correspond to respective radio link monitoring resources, e.g., to respective RLM resources in a space of RLM resources. The bitmap may be populated entirely with zeros, e.g., to indicate that the UE device has no network-configured (e.g., RRC configured) radio link monitoring resources. Alternatively, the bitmap may be populated according to an active Transmission Configuration Indication (TCI) state, e.g., as discussed above. The active TCI state may be indicated in received downlink control information transmitted to the UE device by the network.

In some embodiments, the report does not include any resource bitmap associated with radio link monitoring.

In some embodiments, the processor may determine, based on the report, whether the radio link failure has occurred due to misconfiguration of RLM resources for the UE device. If so, the network may select an improved configuration of RLM resources for the UE device, and transmit a configuration message to configure the UE device with the improved RLM configuration.

In some embodiments, the report may include a list of identifiers or indices specifying reference signal resources associated with an active TCI state of the UE device.

In some embodiments, the radio link failure report transmitted by the UE device may include a list of RLM resources (which were previously configured by the network), instead of a bitmap. (As discussed above, the radio link failure report may be transmitted for the active BWP.) For example, the radio link failure report may include a list of identifiers of NZP CSI-RS resources, where the list specifies the active RLM configuration of the UE device. (NZP is an acronym for Non-Zero Power.) In one embodiment, the list is of NZP CSI-RS resource identifiers may have the structure given by:

failureDetectionResources-CSI-RS SEQUENCE (SIZE
(1 . . . maxNrofFailureDetectionResources)) OF NZP-CSI-RS-ResourceId.

As another example, the radio link failure report may include a list of SSB indices, where the list specifies the active RLM configuration of the UE device. In one embodiment, the list of SSB indices may have the structure given by:

failureDetectionResources-SSB SEQUENCE (SIZE
(1 . . . maxNrofFailureDetectionResources)) OF SSB-Index.

In the context where the network does not provide RLM configuration to the UE device, the UE device may omit the list of RLM resources, or may populate the list with identifiers (or indices) to indicate the CSI-RS resources (or SSB resources) associated with the active TCI state. The active TCI state is indicated to the UE device in downlink control information.

Additional embodiments are described in the following paragraphs

In some embodiments, a method for operating a user equipment (UE) device is be performed as follows. The method comprises transmitting a report to a network, the report indicating a radio link failure, wherein the report includes information specifying a set of reference signal resources associated with a radio link monitoring (RLM) configuration of the UE device.

In some embodiments, said information is a list of identifiers or indices of the reference signal resources in the set associated with the RLM configuration.

In some embodiments, the information includes a bitmap, wherein elements of the bitmap correspond respectively to RLM resources in a space of RLM resources, wherein each element of the bitmap indicates whether or not a corresponding RLM resource of the space is included in the set of reference signal resources of the RLM configuration.

In some embodiments, the set of reference signal resources associated with the RLM configuration are channel state information reference signal (CSI-RS) resources.

In some embodiments, the set of reference signal resources associated with the RLM configuration are Synchronization Signal and Physical Broadcast Channel Block (SSB) resources.

In some embodiments, the report is transmitted only for an active bandwidth part (BWP).

In some embodiments, the report is usable by the network to determine whether the radio link failure occurred due to misconfiguration of RLM resources for the UE device.

In some embodiments, a method for operating a network node may be performed as follows. The method may comprises receiving a report from a user equipment (UE) device, the report indicating a radio link failure, wherein the report includes information specifying a set of reference signal resources associated with a radio link monitoring configuration of the UE device.

In some embodiments, the information is a list of identifiers or indices of the reference signal resources in the set associated with the RLM configuration.

In some embodiments, the information includes a bitmap, wherein elements of the bitmap correspond respectively to RLM resources in a space of RLM resources, wherein each element of the bitmap indicates whether or not a corresponding RLM resource of the space is included in the set of reference signal resources of the RLM configuration.

In some embodiments, the set of reference signal resources associated with the RLM configuration are channel state information reference signal (CSI-RS) resources.

In some embodiments, the set of reference signal resources associated with the RLM configuration are Synchronization Signal and Physical Broadcast Channel Block (SSB) resources.

In some embodiments, the report is for an active bandwidth part (BWP) of the UE device.

In some embodiments, the method further comprises identifying the radio link configuration based on the report; and determining, based on the report and the radio link configuration, whether the radio link failure occurred due to misconfiguration of RLM resources for the UE device.

In some embodiments, a method for operating a user equipment (UE) device may be performed as follows. The method may comprise: in a context where a network of the UE device does not provide radio link monitoring configuration to the UE device, transmitting a report to a network, the report indicating a radio link failure (RLF).

In some embodiments, the report includes a bitmap, wherein elements of the bitmap correspond to respective RLM resources.

In some embodiments, the bitmap is populated entirely with zeros, to indicate that the UE device has no network-configured radio link monitoring resources.

In some embodiments, the bitmap is populated according to an active Transmission Configuration Indication (TCI) state.

In some embodiments, the report does not include any resource bitmap associated with radio link monitoring.

In some embodiments, said transmitting of the report is a transmission to a gNB of a 3GPP 5G New Radio network.

In some embodiments, a method for operating a network node may be performed as follows. The method may comprise: in a context where a network of a user equipment (UE) device does not provide radio link monitoring configuration to the UE device, receiving a report from the UE device, wherein the report indicates a radio link failure.

In some embodiments, the report includes a bitmap, wherein elements of the bitmap correspond to respective radio link monitoring resources.

In some embodiments, the bitmap is populated entirely with zeros, to indicate that the UE device has no network-configured radio link monitoring resources.

In some embodiments, the bitmap is populated according to an active Transmission Configuration Indication (TCI) state, as indicated in received downlink control information.

In some embodiments, the report does not include any resource bitmap associated with radio link monitoring.

In some embodiments, the method further comprises determining, based on the report, whether a radio link failure has occurred between the UE device and a base station of a network.

In some embodiments, the report includes a list of identifiers or indices specifying a set of radio link monitoring resources associated with an active TCI state.

In some embodiments, a non-transitory memory medium may store program instructions. The program instructions, when executed by processing circuitry, may cause the processing circuitry to perform any of the method embodiments described above, and any combination of those embodiments. The memory medium may incorporated as part of a base station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:
operating according to a radio link monitoring (RLM) configuration for an active bandwidth part (BWP);
determining a radio link failure (RLF) of a connection with a network; and
transmitting a report to the network in a UEInformationResponse message including a RLF report, wherein the RLF report indicates channel state information reference signal (CSI-RS) indices of a plurality of CSI-RS RLM configuration bitmaps associated with the RLM configuration, and wherein the plurality of CSI-RS RLM configuration bitmaps are associated with the RLM configuration for the active BWP.

2. The method of claim 1, wherein the plurality of CSI-RS RLM configuration bitmaps comprises two CSI-RS RLM configuration bitmaps, and wherein the RLF report includes information specifying a set of reference signal resources associated with the RLM configuration, and wherein the RLF report comprises a list of identifiers or indices of the reference signal resources in the set associated with the RLM configuration.

3. The method of claim 2, wherein the information includes a bitmap, wherein elements of the bitmap correspond respectively to RLM resources in a space of RLM resources, wherein one or more elements of the bitmap indicate whether or not a corresponding RLM resource of the space is included in the set of reference signal resources of the RLM configuration.

4. The method of claim 2, wherein the set of reference signal resources associated with the RLM configuration are CSI-RS resources.

5. The method of claim 2, wherein the set of reference signal resources associated with the RLM configuration are Synchronization Signal and Physical Broadcast Channel Block (SSB) resources.

6. The method of claim 1, wherein the report is transmitted to a Next Generation Node B (gNB) of a 3GPP 5G New Radio network.

7. The method of claim 1, wherein the report is usable by the network to determine whether the radio link failure occurred due to misconfiguration of RLM resources.

8. A method, comprising:
transmitting a radio link monitoring (RLM) configuration to a user equipment (UE) device for an active bandwidth part (BWP); and
receiving a report from the UE device, the report in a UEInformationResponse message including a radio link failure (RLF) report, wherein the RLF report indicates channel state information reference signal (CSI-RS) indices of a plurality of CSI-RS RLM configuration bitmaps associated with the first RLM configuration, and wherein the plurality of CSI-RS RLM configuration bitmaps indicate the RLM configuration for the active BWP.

9. The method of claim 8, wherein the RLF report includes information specifying a set of reference signal resources associated with the RLM configuration of the UE device, and wherein the RLF report comprises a list of identifiers or indices of the reference signal resources in the set associated with the RLM configuration.

10. The method of claim 9, wherein the information includes a bitmap, wherein elements of the bitmap correspond respectively to RLM resources in a space of RLM resources, wherein one or more elements of the bitmap indicate whether or not a corresponding RLM resource of the space is included in the set of reference signal resources of the RLM configuration.

11. The method of claim 9, wherein the set of reference signal resources associated with the RLM configuration are CSI-RS resources.

12. The method of claim 9, wherein the set of reference signal resources associated with the RLM configuration are Synchronization Signal and Physical Broadcast Channel Block (SSB) resources.

13. The method of claim 9, further comprising:
identifying the RLM configuration based on the report; and
determining, based on the report and the RLM configuration, whether the radio link failure occurred due to misconfiguration of RLM resources for the UE device.

14. An apparatus comprising:
at least one processor configured to cause the apparatus to:
operate according to a radio link monitoring (RLM) configuration for an active bandwidth part (BWP);
determine a radio link failure (RLF) of a connection with a network; and
transmit a report to the network in a UEInformationResponse message including a RLF report, wherein the RLF report indicates channel state information reference signal (CSI-RS) indices of one or more CSI-RS RLM configuration bitmaps associated with the RLM configuration, and wherein the one or more CSI-RS RLM configuration bitmaps indicate the RLM configuration for the active BWP.

15. The apparatus of claim 14, wherein the RLF report includes information specifying a set of reference signal resources associated with the RLM configuration of a user equipment (UE), and wherein the RLF report comprises a list of identifiers or indices of the reference signal resources in the set associated with RLM configuration.

16. The apparatus of claim 15, wherein the information includes a bitmap, wherein elements of the bitmap correspond respectively to RLM resources in a space of RLM resources, wherein one or more elements of the bitmap indicate whether or not a corresponding RLM resource of the space is included in the set of reference signal resources of the RLM configuration.

17. The apparatus of claim 15, wherein the set of reference signal resources associated with the RLM configuration are CSI-RS resources.

18. The apparatus of claim 15, wherein the set of reference signal resources associated with the RLM configuration are Synchronization Signal and Physical Broadcast Channel Block (SSB) resources.

19. The apparatus of claim 14, further comprising:
a radio operably coupled to the at least one processor.

20. The apparatus of claim 14, wherein the report is transmitted to a Next Generation Node B (gNB) of a 3GPP 5G New Radio network.

* * * * *

UNITED STATES PATENT AND TRADEMARK OFFICE
CERTIFICATE OF CORRECTION

PATENT NO. : 12,323,834 B2
APPLICATION NO. : 18/298904
DATED : June 3, 2025
INVENTOR(S) : Yuqin Chen et al.

Page 1 of 1

It is certified that error appears in the above-identified patent and that said Letters Patent is hereby corrected as shown below:

In the Claims

Column 23, Line 38, Claim 8, delete "the first RLM" and substitute --the RLM--.

Signed and Sealed this
Fifteenth Day of July, 2025

Coke Morgan Stewart
*Acting Director of the United States Patent and Trademark Office*